United States Patent [19]

Arase et al.

[11] Patent Number: 5,437,805
[45] Date of Patent: Aug. 1, 1995

[54] PARTICLES CONTAINING IRON CARBIDE

[75] Inventors: Takuya Arase, Settsu; Yoshiyuki Shibuya; Shigeo Daimon, both of Osaki, all of Japan

[73] Assignee: 501 Daiken Industries Ltd., Osaka, Japan

[21] Appl. No.: 134,873

[22] Filed: Oct. 12, 1993

Related U.S. Application Data

[60] Continuation of Ser. No. 864,729, Apr. 7, 1992, abandoned, which is a division of Ser. No. 758,370, Sep. 10, 1991, abandoned, which is a continuation of Ser. No. 596,619, Oct. 12, 1990, abandoned, which is a continuation of Ser. No. 342,512, Apr. 24, 1989, abandoned, which is a division of Ser. No. 944,163, Dec. 22, 1986, Pat. No. 4,900,464.

[30] Foreign Application Priority Data

Dec. 24, 1985 [JP] Japan .................................. 60-290989
Jul. 4, 1986 [JP] Japan .................................. 61-158369
Sep. 8, 1986 [JP] Japan .................................. 61-211200

[51] Int. Cl.$^6$ ............................................. C01B 31/30
[52] U.S. Cl. .............................. 252/62.51; 423/633
[58] Field of Search ........................ 252/62.51; 423/633

[56] References Cited

U.S. PATENT DOCUMENTS 4,414,196 11/1983 Matsumoto et al. ................. 423/633
4,668,414 5/1987 Okamura et al. ................. 252/62.51

Primary Examiner—Mark L. Bell
Assistant Examiner—C. M. Bonner
Attorney, Agent, or Firm—Nikaido, Marmelstein, Murray & Oram

[57] ABSTRACT

The present invention provides acicular particles (A) containing an iron carbide, which have (a) a free carbon content of at most 20 wt. %, and (b) and $Fe_5C_2$ ratio(x) of at least 70% and a coercive force of $3X+300$ to $7X+270$ Oe, the ratio(x) being expressed by $$x = \frac{S1 \times 100}{S1 + S2}$$

where S1 is the X-ray diffraction strength of $Fe_5C_2$, and S2 is the X-ray diffraction strength of $Fe_3O_4$.

The invention further provides particles (B) containing nickel and an iron carbide.

The invention further provides acicular particles containing an iron carbide which are obtained by heating an aqueous dispersion of ferric hydroxide in an alkaline system in the presence of a water-soluble compound capable of coordinating to iron to obtain acicular α-ferric oxide and contacting the product with a carbon-containing reducing-and-carburizing agent or with a mixture of the agent and a carbon-free reducing agent, with or without contacting the product with the carbon-free reducing agent.

These particles (A) and (C) are controllable in coercive force and usable for magnetic record media of various standards.

5 Claims, 1 Drawing Sheet

PARTICLES CONTAINING IRON CARBIDE

This application is a continuation of prior application Ser. No. 07/864,729, now abandoned, filed on Apr. 7, 1992, which is a divisional of Ser. No. 07/758,370, filed on Sep. 10, 1991, now abandoned, which is a continuation of Ser. No. 07/596,619, filed on Oct. 12, 1990, now abandoned, which is a continuation of Ser. No. 07/342,512, filed Apr. 24, 1989, now abandoned, which is a divisional of Ser. No. 06/944,163, filed Dec. 22, 1986, now U.S. Pat. No. 4,900,464.

The present invention relates to acicular particles containing iron carbide.

To give an increased recording density to recording media constructed of a magnetic material, e.g. magnetic tape, it is generally desirable that the magnetic material have a high coercive force. However, the coercive force of the magnetic material is required to accord with the ability of the head of recording and play back system.

Acicular particles containing iron carbide have a high coercive force, are electrically conductive, possess high hardness and are therefore excellent magnetic particles for preparing magnetic recording media. Such iron carbide-containing acicular particles are prepared, for example, by contacting acicular iron oxyhydroxide particles or acicular iron oxide particles with a reducing-and-carburizing agent at 250 to 400° C. It is known that the acicular iron carbide particles contain $Fe_5C_2$ as the main iron carbide component, $Fe_3O_4$ (magnetite) and free carbon. However, such acicular particles containing iron carbide are not always usable for heads of any ability because of their exceedingly high coercive force. Accordingly, it has been desired to develop particles containing an iron carbide having a relatively low coercive force or an optionally designed coercive force.

To give an increased output, it is further required that magnetic particles for magnetic recording media be greatly magnetized.

The coercive force of iron carbide-containing particles is controllable either (1) by interrupting the carburization reaction, or (2) by elevating the temperature of the carburization reaction. Nevertheless, the product obtained by the method (1) contains a large amount of $Fe_3O_4$ and has a poor distribution of coercive forces and is small in magnetization, giving a magnetic recording medium which permits changes with time-lapse, in the record and magnetic transfer of the record. Further the method (2) involves decomposition of the reducing-and-carburizing agent as a side reaction which deposits a large quantity of carbon, with the result that acicular particles which are generally low in magnetization are obtained.

An object of the present invention is to provide acicular particles containing an iron carbide which is relatively low in coercive force and great in magnetization.

Another object of the present invention is to provide acicular particles containing an iron carbide and outstanding in coercive force distribution, acicular shape retentivity, etc.

Another object of the present invention is to provide acicular particles containing an iron carbide and having a coercive force suited to the ability of the head to be used.

Still another object of the present invention is to provide particles containing an iron carbide, low in the contents of $Fe_3O_4$ and elemental carbon and controllable in coercive force.

The present invention provides acicular particles (A) containing an iron carbide, which have (a) a free carbon content of at most 20 wt. %, and (b) an $Fe_5C_2$ ratio(x) of at least 70% and a coercive force of $3x+300$ to $7x+270$ Oe, the ratio(x) being expressed by $$x = \frac{S1 \times 100}{S1 + S2}$$

wherein S1 is the X-ray diffraction strength of $Fe_5C_2$, and S2 is the X-ray diffraction strength of $Fe_3O_4$.

The invention further provides particles (B) containing nickel and an iron carbide.

The invention further provides acicular particles (C) containing an iron carbide and obtained by heating an aqueous dispersion of ferric hydroxide in an alkaline system in the presence of a water-soluble compound capable of coordinating to iron to obtain acicular $\alpha$-ferric oxide and contacting the produce with a carbon-containing reducing-and-carburizing agent or with a mixture of the agent and a carbon-free reducing agent, with or without contacting the product with the carbon-free reducing agent.

The acicular particles (A) are prepared, for example, by heating acicular FeOOH particles at 700 to 1000° C. to obtain acicular $\alpha$-$Fe_2O_3$ particles, optionally contacting the $Fe_2O_3$ particles with a reducing agent not having carburizing ability at 200 to 700° C., and contacting the resulting particles with a reducing-and-carburizing agent at 250 to 400° C.

Iron carbide-containing acicular particles heretofore known (e.g. those disclosed in Unexamined Japanese Patent Publication No. 71509/1985) are above $7x+270$ to not greater than $7x+470$ Oe in coercive force y when containing up to 20 wt. % of free carbon and having an $Fe_5C_2$ ratio(x) of at least 70. None of iron carbide-containing acicular particles are known which have a low coercive force y of up to $7x+270$ Oe as contemplated by the present invention.

Figure 1:
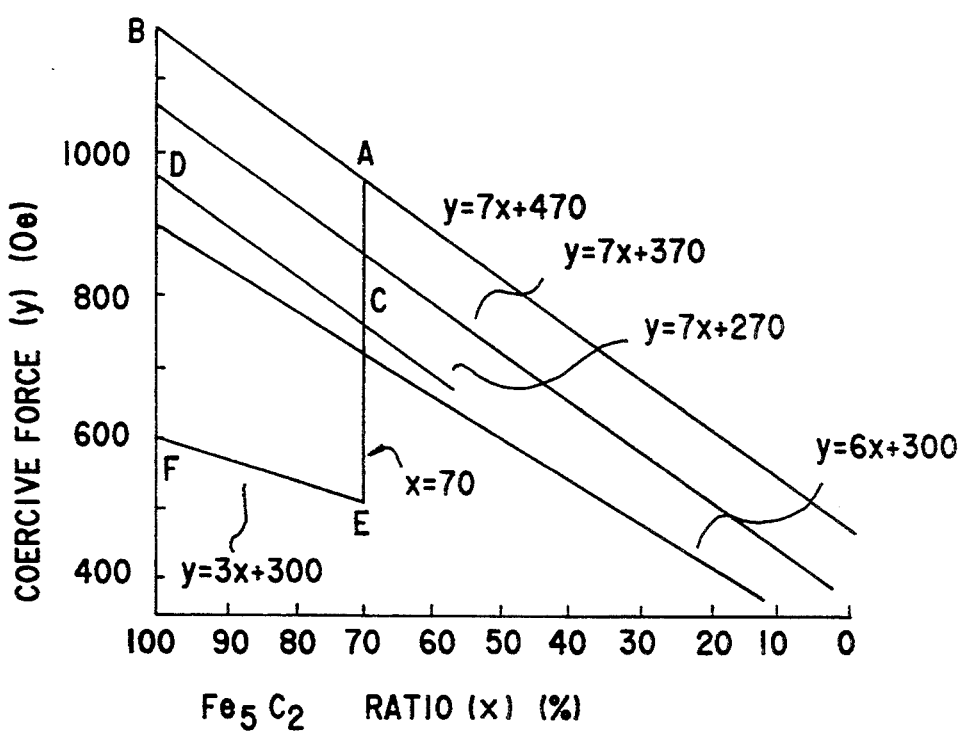
FIG. 1 shows the relationship between the $Fe_5C_2$ ratio and the coercive force.

With reference to FIG. 1 showing the relation between the $Fe_5C_2$ ratio(x) and the coercive force(y), the area ABDC represents conventional iron carbide-containing acicular particles, while the area CDFE represents the particles of the invention.

Although the reason why iron carbide-containing acicular particles having a relatively low coercive force can be obtained according to the invention is not yet clarified, the reason will presumably be as follows. The conventional $\alpha$-$Fe_2O_3$ particles are obtained by dehydrating FeOOH at a relatively low temperature of about 350° C. and have relatively small crystallites, whereas FeOOH is dehydrated at a high temperature of 700 to 1000° C. according to the invention so that relatively large $\alpha$-$Fe_2O_3$ particles can be obtained.

The acicular iron oxyhydroxide (FeOOH) to be used in the present invention may be $\alpha$-, $\beta$- or $\gamma$-FeOOH, which gives acicular $\alpha$-$Fe_2O_3$ when heated at about 700 to 1000° C., preferably 750 to 900° C.

With the present invention, the acicular $\alpha$-$Fe_2O_3$ thus obtained is subsequently brought into contact with a reducing-and-carburizing agent at 250 to 400° C., whereby the desired iron carbide-containing acicular particles are prepared. This step can be performed after contacting the Fe$_2$O$_3$ with a reducing agent having no carburizing ability, e.g. hydrogen, at 200 to 700° C.

The starting acicular iron oxyhydroxides can be those usually at least 3, preferably 3 to 20, in average axial ratio and having an average particle size (long axis) of usually up to 2 μm, preferably 0.1 to 2 μm, most preferably 0.1 to 1.0 μm. As will be described later, the acicular particles (A) produced are slightly smaller than, but almost unchanged from, the starting material in average axial ratio and in average particle size, so that the acicular particles (A) in general preferably have such sizes as already stated.

The acicular iron oxyhydroxides to be used for the process for producing acicular particles (A) may have added thereto a small amount or small amounts of a compound, such as oxide or carbonate of copper, magnesium, manganese or nickel; silicon oxide; potassium salt, sodium salt, etc., insofar as the starting material chiefly comprises an iron oxyhydroxide.

As the reducing-and-carburizing agent, at least one of the following compounds can be used.

① CO

② aliphatic, linear or cyclic, saturated or unsaturated hydrocarbons such as methane, propane, butane, cyclohexane, methylcyclohexane, acetylene, ethylene, propylene, butadiene, isoprene, town gas, etc.

③ aromatic hydrocarbons such as benzene, toluene, xylene, alkylated or alkenylated derivatives thereof having a boiling point up to 150° C.

④ aliphatic alcohols such as methanol, ethanol, propanol, cyclohexanol, etc.

⑤ esters such as methyl formate, ethyl acetate and like ester having a boiling point up to 150° C.

⑥ ethers such as lower alkyl ether, vinyl ether and like ether having a boiling point up to 150° C.

⑦ aldehydes such as formaldehyde, acetaldehyde and like aldehyde having a boiling point up to 150° C.

⑧ ketones such as acetone, methyl ethyl ketone, methyl isobutyl ketone and like ketone having a boiling point up to 150° C.

Particularly preferably reducing-and-carburizing agent are CO, CH$_3$OH, HCOOCH$_3$, saturated or unsaturated aliphatic hydrocarbons having 1 to 5 carbon atoms.

In the process of preparing the acicular particles (A), the reducing-and-carburizing agent can be used as it is or as diluted. Examples of diluents are N$_2$, argon, helium, etc. The dilution ratio is suitably selected but is preferably about 1 to about 10 times (by volume). The contacting temperature, contacting time, gas flow rate and other conditions depend, for example, on the production history, average axial ratio, average particle size and specific surface area of the acicular iron oxide. The preferred contacting temperature is about 250 to about 400° C., more preferably about 300 to about 400° C. The preferred contacting time is about 0.5 to about 6 hours. The preferred gas flow rate (excluding diluent) is about 1 to about 1000 ml S.T.P./min, more preferably about 5 to about 500 ml S.T.P./min, per gram of the acicular iron oxide. The contacting pressure inclusive of that of the diluent is usually 1 to 2 atom, although not limited particularly.

The particles (A) are in the form of generally uniform acicular particles when observed under an electron microscope. The particles (A) are present as primary particles and have the same acicular particulate form as the starting acicular particles. The acicular particles (A) are found to contain carbon by elementary analysis and to contain an iron carbide by its X-ray diffraction pattern, which exhibits plane spacings at 2.28 Å, 2.20 Å, 2.08 Å, 2.05 Å and 1.92 Å. Such pattern corresponds to Fe$_5$C$_2$. The iron carbide component of the acicular particles (A) chiefly comprises Fe$_5$C$_2$.

In most cases, the acicular particles (A) further contain an iron oxide component which is chiefly Fe$_3$O$_4$.

While the acicular particles (A) are likely to contain free carbon, the content thereof must not exeed 20 wt. %. If it is over 20 wt. %, a reduced amount of magnetization will result undesirably.

The acicular particles of the present invention are at least 70%, preferably at least 80%, in Fe$_5$C$_2$ ratio(x) expressed by the equation $$x = \frac{S1 \times 100}{S1 + S2}$$

wherein S1 is the X-ray diffraction strength of Fe$_5$C$_2$, and S2 is the X-ray diffraction strength of Fe$_3$O$_4$. The present acicular particles are further in the range of $3x + 300$ to $7x + 270$ Oe, preferably $3x + 300$ to $6x + 300$ Oe, in coercive force.

The acicular particles (A) are slightly smaller than but almost the same as the starting acicular particles in average axial ratio and average particle size. Accordingly the acicular particles (A) have an average axial ratio usually of at least 3, preferably of 3 to 20, and an average particle size (long axis) usually of up to 2 μm, preferably of 0.1 to 2 μm, most preferably of 0.1 to 1.0 μm.

The particles (B) of the present invention which contain nickel and an iron carbide are prepared, for example, by mixing together an aqueous solution of nickel salt, an aqueous solution of ferrous salt and an aqueous solution of alkali to form a dispersion, introducing oxygen or an oxygen-containing gas into the dispersion to obtain particles of α-iron oxyhydroxide containing nickel, and filtering up, drying and carburizing the particles. Alternatively, the particles (B) can be prepared by mixing together iron oxyhydroxide or iron oxide particles, a water-soluble nickel salt and water to form a slurry, admixing with the slurry a reagent for converting the nickel salt to an insoluble or sparingly soluble nickel compound to cover the surfaces of the particles with the nickel compound, and filtering up, drying and carburizing the particles.

Examples of nickel salts useful for the first process are nickel chloride, nickel sulfate, nickel nitrate, nickel acetate and the like. Examples of useful ferrous salts are ferrous chloride, ferrous sulfate and the like. Examples of useful alkalis are hydroxides or carbonates of Na, K, Ca, Mg, etc., ammonia and the like. The nickel salt and the ferrous salt are used in such a ratio that usually 0.2 to 30 atomic %, preferably 0.2 to 10 atomic %, of nickel is present based on the iron. The aqueous alkali solution is used in at least two times, preferably at least three times, the amount equivalent to the iron.

In the above first process, the aqueous solutions of nickel salt, ferrous salt and alkali are mixed together to form a dispersion, and oxygen or oxygen-containing gas, such as air, is introduced into the dispersion to form nickel-containing α-iron oxyhydroxide. Oxygen or oxygen-containing gas is passed through the dispersion for oxidation, preferably at a rate of 10 to 1000 c.c./min reduced to oxygen basis per mole of the Fe(OH)$_2$ (ferrous hydroxide) formed in the dispersion.

The precipitate thus produced is then filtered off, dried and carburized to obtain particles containing nickel and iron carbide. The precipitate is dried preferably by being allowed to stand at room temperature or being heated at a temperature of up to 250° C. The carburizing agents are the same compounds as those mentioned in the reducing-and-carburizing agent in the preparation of the acicular particles (A). The carburization can be conducted in the same manner as in the preparation of the particles (A) with the exception of using the above precipitate.

For the second process of the preparation of the particles (B), examples of iron oxyhydroxides are α-FeOOH, β-FeOOH, γ-FeOOH and the like, examples of iron oxides are α-Fe$_2$O$_3$, γ-Fe$_2$O$_3$, Fe$_3$O$_4$ and the like, and examples of nickel salts are those exemplified for the first process. According to the second process, to a slurry prepared from iron oxyhydroxide or iron oxide particles, water-soluble nickel salt and water is added a reagent for converting the nickel salt to an insoluble or sparingly soluble nickel compound to cover the surfaces of the particles with the nickel compound, and the covered particles are filtered up, dried and carburized, whereby particles containing nickel and iron carbide are obtained. Whether the nickel is in the form of nickel carbide or nickel oxide or in some other form is not yet clarified. The nickel salt and the particulate iron are used in such a ratio that usually 0.2 to 30 atomic %, preferably 0.2 to 20 atomic %, of nickel is present based on the iron. Examples of reagents useful for converting the nickel slat to an insoluble or sparingly soluble compound are alkali hydroxides such as KOH and NaOH; alkali carbonates such as Na$_2$CO$_3$ and NaHCO$_3$; ammonia; alkali cyanates such as KCN and NaCN; phosphoric acid or phosphates such as Na$_2$HPO$_4$ and NaH$_2$PO$_4$; hydrogen sulfide; oxalic acid or oxalates such as potassium oxalate; chelating agents such as acetylacetone and dimethylglyoxime; etc. The present is used in an amount sufficient to produce an insoluble or sparingly soluble nickel compound. The particles covered with the nickel compound can be filtered up, dried and carburized in the same manner as in the first process.

The particles (B) obtained by the above process are in the form of generally uniform particles when observed under an electron microscope. The particles (B) contain nickel in the interior or surfaces thereof. The particles (B) obtained are found to contain carbon by elementary analysis and to contain an iron carbide by its X-ray diffraction pattern, which exhibits plane spacings at 2.28 Å 2.20 Å, 2.08 Å, 2.05 Å and 1.92 Å. Such pattern corresponds to Fe$_5$C$_2$. The iron carbide component of the particles (B) chiefly comprises Fe$_5$C$_2$.

The particles (B) may further contain an iron oxide component which is chiefly Fe$_3$O$_4$.

While the particles (B) are likely to contain free carbon, the content thereof must not exceed 20 wt. %. If it is over 20 wt. %, a reduced amount of magnetization will result undesirably.

The particles (B) are slightly smaller than but almost the same as the starting particles in average axial ratio and average particle size. Accordingly the particles (B) have an average axial ratio usually of 1 to 20, preferably 3 to 20, and an average particle size (long axis) usually of up to 2 μm, preferably 0.1 to 2 μm, most preferably 0.1 to 1.0 μm.

Figure 2:
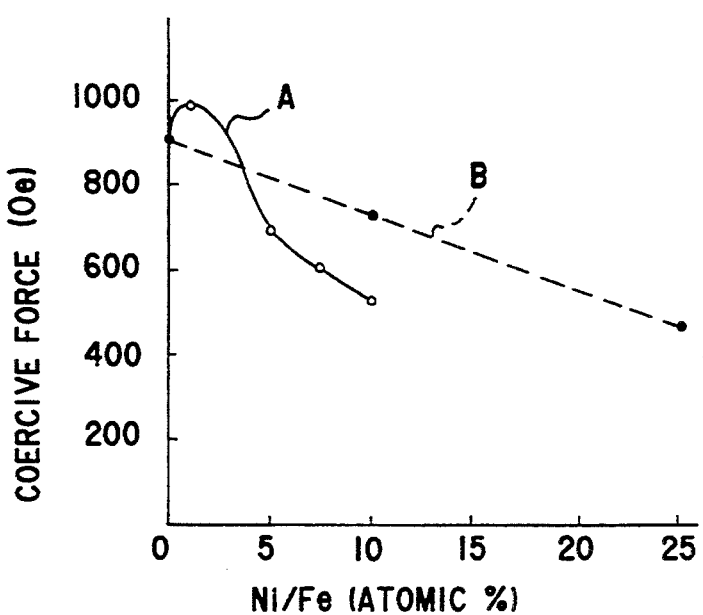
FIG. 2 shows the relationship between the Ni content and the coercive force.

FIG. 2 shows the relationship between the Ni content and the coercive force for particles (B) containing Ni in the interior and for those covered with Ni on their surfaces. More specifically, Curve A represents the relationship between the Ni content and the coercive force determined for magnetic particles which were prepared by adding NiCl$_2$ to 0.5 liter of 0.8 mole/liter solution of FeCl$_2$ in an Ni/Fe ratio of 1 to 10 atomic %, adding the solution to 1.5 liters of 2.67 moles/liter solution of NaOH, passing air through the mixture at a rate of 0.5 liter/min to produce α-FeOOH containing Ni, heating the product in air at 350° C. and thereafter heating the product in a CO stream at 340° C. Further Curve B represents the relationship corresponding to Curve A determined for magnetic particles which were prepared by adding NaOH solution to 2 liters of an aqueous slurry containing 20 g of α-FeOOH particles and NiCl$_2$ solute in the Ni/Fe ratio of 0 to 25 atomic % to cause Ni(OH)$_2$ to deposit on the surfaces of the α-FeOOH particles, heating the particles in air at 600° C. and thereafter heating the particles in a CO stream at 300° C.

The drawing indicates that the coercive force of the particulate magnetic material can be controlled as desired by varying the Ni content. The particles were low in the contents of magnetite and elemental carbon and were almost free of sintering.

The ferric hydroxide to be used for producing acicular particles (C) of the present invention can be prepared by any method. Usually, however, an alkali such as sodium hydroxide, potassium hydroxide or ammonia is added to an aqueous solution of a ferric salt such as ferric chloride, sulfate or nitrate, whereby ferric hydroxide is obtained in the form of an amorphous precipitate. This method is already well known. Depending on the reaction condition, it is likely that the precipitate obtained still has as a constituent atom thereof the anion constituting the ferric salt. Such a precipitate is also usable in the invention as ferric hydroxide.

The aqueous dispersion to be used may have such a ferric hydroxide concentration that the mixture of the dispersion and a water-soluble compound capable of coordinating to iron can be stirred as will be described below without difficulty, preferably in the presence of seed crystals. Usually, the concentration is up to 1.5 moles/liter, preferably 0.1 to 1 mole/liter, calculated as iron.

The water-soluble compound having coordinating ability for iron and to be used in the present invention is selected from among the water-soluble organic or inorganic compounds which act as crystallization control agent to control the direction and speed of growth of the α-ferric oxide crystals formed when the aqueous dispersion of ferric hydroxide is heated so as to produce acicular crystals. Such compounds have within the molecule at least one coordination group containing atoms having coordinating ability for iron, such as oxygen, nitrogen and/or sulfur atom(s). Examples of such coordination groups are —OH, —COOH, —O—, >C=O, —SO$_3$H, —PO$_3$H$_2$, —NH$_2$, =N—OH, →N, —SH, —S—, >C=S, —CS$_2$H, —COSH, —OCN, etc. Preferably, the water-soluble compound capable of coordinating to iron and to be used for the invention has within the molecule at least two such coordination groups which may be the same or different.

Examples of preferred water-soluble compounds capable of coordinating to iron for use in the present invention are succinic acid, maleic acid, nitrolotriacetic acid and like polycarboxylic acids, especially di- and tri-carboxylic acids; citric acid, tartaric acid, glycolic acid, malic acid, α-methylmalic acid, α-hydroxyglutaric acid, dihydroxyglutaric acid, salicylic acid and like hydroxycarboxylic acids; lysine, glycine and like amino-carboxylic acids; ethylenediamine and like polyamines; hydroxylamine; aminotri(methylenephosphonic acid), ethyleenediaminotetra(methylenephosphonic acid), ethylene-1,1'-diphosphonic acid, 1-hydroxyethylene-1,1'-diethylene-phosphonic acid and like organiphosphonic acids; cysteine, mercaptoacetic acid and like thiocarboxylic acids; mannitol, pentaerythritol and like polyhydric alcohols; acetylacetone, ethyl acetoacetate and like β-dicarbonyl compounds, sulfophenylminidiacetic acid and like aromatic sulfonic acids; etc. Water-soluble salts or esters of these compounds are also usable in the present invention insofar as they have coordinating ability for iron. Examples of such salts or esters are sodium citrate, sodium tartrate, sodium 1-hydroxypropyl-1,1'-diphosphonate, triethyl citrate, dimethyl hydroxysuccinate, ethyl mercaptoacetate, etc. Further according to the invention, phosphoric acid salts are also usable which include, for example, sodium phosphate, potassium phosphate, ammonium phosphate, etc.

While various compounds are usable in the present invention as mentioned above, especially preferable are the above-mentioned aliphatic hydroxycarboxylic acids, organiphosphonic acids to be mentioned below, and salts and esters thereof.

Organiphosphonic acids represented by the formula

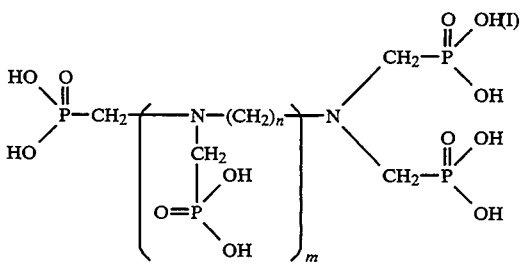

wherein n is an integer of 2 to 6, and m is 0 or an integer of 1 to 5, and salts or esters of the acids.

Organophosphonic acids represented by the formula

wherein X and Y are each hydrogen, hydroxyl, amino, alkyl or aryl, and q is an integer of 1 to 6, and salts or ester of the acids.

Organiphosphonic acids represented by the formula

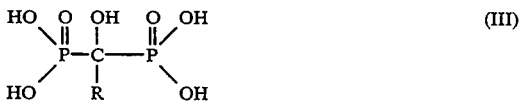

wherein R is hydrogen or alkyl, and salts or esters of the acids.

More specific examples of organiphosphonic acids represented by the formula (I) are aminotri(methylenephosphonic acid), ethylenediaminotetra(methylenephosphonic acid), diethylenetriaminopenta(methylenephosphonic acid), triethylenetetraaminohexa(methylenephosphonic acid), tetraethylenepentaaminohepta(methylenephosphonic acid), pentaethylenehexaaminoocta(methylenephosphosphonic acid) and the like. In the formula (II), the alkyl group preferably has 1 to 6 carbon atoms, and the aryl group preferably has 6 to 14 carbon atoms. Examples of such organophosphonic acids are methylenediphosphonic acid, ethylene-1,1'-diphosphonic acid, ethylene-1,2-diphosphonic acid, propylene-1,1'-diphosphonic acid, propylene-1,3-diphosphonic acid, hexamethylene-1,6-diphosphonic acid, 2,6-dihydroxypentamethylene-2,4-diphosphonic acid, 2,5-dihydroxyhexamethylene-2,5-diphosphonic acid, 2,3-dihydroxybutylene-2,3-diphosphonic acid, 1-hydroxybenzyl-1,1'-diphosphonic acid, 1-aminoethylene-1,1'-diphosphonic acid and the like.

In the formula (III), the alkyl group preferably has 1 to 5 carbon atoms. Examples of such organophosphonic acids are hydroxymethylenediphosphonic acid, 1-hydroxyethylene-1,1'-diphosphonic acid, 1-hydroxypropylene-1,1'-diphosphonic acid, 1-hydroxybutylene-1,1'-diphosphonic acid, 1-hydroxyhexamethylene-1,1'-diphosphonic acid and the like.

The water-soluble compound capable of coordinating to iron is used in an amount which is not limited specifically provided that it is sufficient to control the direction and speed of growth of α-ferric oxide crystals in the hydrothermal reaction. The amount is usually $1 \times 10^{-5}$ to 3 moles, preferably $1 \times 10^{-4}$ to $1 \times 10^{-1}$ mole, per gram atom of the iron of the ferric hydroxide. Generally, if the water-soluble compound is used in too small an amount, it is difficult to obtain α-ferric oxide in the desired acicular form, whereas use of an excess of the compound requires a longer period of time for the reaction, hence undesirable.

When the aqueous dispersion of ferric hydroxide is heated in an alkaline system in the presence of the water-soluble compound capable of coordinating to iron, acicular α-Fe$_2$O$_3$ which is substantially free from voids can be obtained. If the hydrothermal reaction is conducted in the presence of seed crystals of α-Fe$_2$O$_3$ in addition to the water-soluble compound, acicular α-Fe$_2$O$_3$ can be obtained with a greatly diminished particle size distribution.

The seed crystals of α-Fe$_2$O$_3$ are not limited specifically in shape but can be acicular, spherical, cubic or of any desired shape, provided that the smallest width thereof is up to 0.4 μm, preferably up to 0.2 μm, on the average. If the smallest width of the iron oxide seed crystals is over 0.4 μm on the average, the acicular α-iron oxide obtained is smaller in axial ratio and/or greater in average particle size than is desired. Although there is no particular lower limit for the average smallest width of the α-iron oxide seed crystals, it is usually about 100 Å. α-Iron oxide which is in such a range in the average smallest width is commercially available or can be prepared by a known method.

The α-iron oxide serving as seed crystals is used in an amount of 0.1 mole % to 25 mole %, preferably 0.5 to 15 mole %, calculated as iron and based on the starting material, i.e. ferric hydroxide. If the amount is less than 0.1 mol %, the acicular α-iron oxide particles obtained are excessively large, whereas if it is more than 25 mol %, the product is smaller than is desired in axial ratio and/or particle size.

According to the present invention, satisfactory results can be achieved insofar as the water-soluble compound capable of coordinating to iron (and also seed crystals) is present when the aqueous dispersion of ferric hydroxide is heat-treated. The compound and the seed crystals can be added in a desired order. For example, the water-soluble compound and/or seed crystals may be admixed with the aqueous solution of ferric salt before ferric hydroxide is to be precipitated from the solution. In this case, the water-soluble compound capable of coordinating to iron is attached by coordination to the iron atom of the ferric hydroxide and consequently contained in the precipitate, so that there is no need to additionally admix the compound with the dispersion of ferric hydroxide to be heat-treated. Usually, however, it is desirable to add the seed crystals and the water-soluble compound to the aqueous dispersion of ferric hydroxide.

The thermal reaction is conducted at a pH of at least 7, preferably 8 to 12.5. Although the alkali to be used is not limited specifically, sodium hydroxide, potassium hydroxide, ammonia or the like is usually used. The alkali is added to the aqueous dispersion of ferric hydroxide before or after the addition of the water-soluble compound or seed crystals.

Generally, the reaction temperature is preferably at least 100° C. in the preparation of the paraticles (C). At lower reaction temperatures, branched particles such as cross-shaped or T-shaped particles or $\alpha$-FeOOH particles are formed, presenting difficulty in obtaining $\alpha$-$Fe_2O_3$ in the desired acicular form. When conducted at a temperature of at least 100° C., the reaction produces no branched particles or $\alpha$-FeOOH. The upper limit of the reaction temperature is below a temperature level at which the water-soluble compound capable of coordinating to iron starts thermal decomposition. While the reaction may be conducted at an increased pressure, it is usually unnecessary to intentionally apply pressure to the reaction system, such that the mixture to be reacted is heated and stirred merely in a closed reactor. In this case, the reaction temperature is usually 100 to 250° C., preferably about 130 to about 200° C. Although not limited specifically, the reaction time is usually several tens of minutes to several hours.

In this way, acicular $\alpha$-iron oxide can be obtained. The shape and dimensions of the oxide particles are controllable as desired by varying the heating temperature for the above reaction and selecting the kind and amount of the water-soluble compound capable of coordinating to iron, the amount and dimensions of the seed crystals, etc.

According to the present invention, the acicular $\alpha$-$Fe_2O_3$ is then brought into contact with a carbon-containing reducing-and-carburizing agent or with a mixture of the agent and a carbon-free reducing agent, with or without contacting the oxide with the carbon-free reducing agent, whereby the desired acicular particles (C) containing iron carbide can be obtained.

The carbon-free reducing agent is, for example, hydrogen or the like. When the oxide is to be contacted with this agent, the contact is effected usually at about 200 to about 700° C.

As the reducing-and-carburizing agents are used the same compounds as those mentioned in the preparation of the acicular particles (A). The carburization can also be carried out in the same manner as in the preparation of the particles (A) with the exception of using the above acicular $\alpha$-$Fe_2O_3$.

The particles (C) are in the form of generally uniform acicular particles when observed under an electron microscope. The particles (C) are present as primary particles and have the same acicular particulate form as the starting acicular particles. The acicular particles (C) are found to contain carbon by elementary analysis and to contain an iron carbide by its X-ray diffraction pattern, which exhibits plane spacings at 2.28 Å, 2.20 Å, 2.08 Å, 2.05 Å and 1.92 Å. Such pattern corresponds to $Fe_5C_2$. The iron carbide component of the acicular particles (C) chiefly comprises $Fe_5C_2$.

In most cases, the acicular particles (C) further contain an iron oxide component which is chiefly $Fe_3O_4$.

While the acicular particles (C) are likely to contain free carbon, the content thereof must not exeed 20 wt. %. If it is over 20 wt. %, a reduced amount of magnetization will result undesirably.

The acicular particles (C) are slightly smaller than but almost the same as the starting acicular particles in average axial ratio and average particle size. Accordingly the acicular particles (C) have an average axial ratio usually of at least 3, preferably 3 to 20, and an average particle size (long axis) usually of up to 2 $\mu$m, preferably 0.1 to 2 $\mu$m, most preferably 0.1 to 1.0 $\mu$m.

The particles (A), (B) and (C) of the present invention containing iron carbide are useful as a magnetic material for magnetic recording as is apparent from the foregoing characteristics, etc., while the use thereof is not limited thereto. For example, the particles are usable as a catalyst for preparing lower aliphatic hydrocarbons from CO and $H_2$.

The iron carbide-containing acicular particles (A) of the present invention are excellent in coercive force distribution and acicular shape retentivity.

The acicular particles (A) of the invention can be adapted to have a coercive force suited to the ability of the head to be used and is outstanding in electrical conductivity and hardness.

The acicular particles (A) of the invention are about 10 to about 30% greater in magnetization than cobalt-modified magnetic particles which are comparable to the particles (A) in coercive force.

The particles (B) containing nickel and iron carbide are low in the contents of $Fe_3O_4$ and elemental carbon, controllable in coercive force and usable for magnetic record media of various standards.

The iron carbide-containing acicular particles (C) are characterized by being relatively low in coercive force and great in magnetization. More specifically, the acicular particles (C) have a relatively low coercive force of about 600 to about 750 Oe and a great saturation magnetization of about 85 to about 95 emu/g.

The present invention will be described in greater detail with reference to the following examples, in which the characteristics were determined by the following methods.

(1) Magnetic Characteristics

Unless otherwise stated, the magnetic characteristics were determined by an automatic recorder of direct current magnetization characteristics, Model BHH-50, product of Riken Denshi Co., Ltd., having a maximum magnetic field of 2500 Oe.

(2) Analysis of Total Carbon Content

According to the usual method of C elementary analysis using MT2 CHN CORDER Yanaco, product of Yanagimoto Seisakusho Co., Ltd. and oxygen (helium carrier) which was passed through the tube containing the particles to be analysed at 900° C.

(3) Free Carbon Content Analysis

The free carbon content was calculated from the total carbon content determined by CHN elementary analysis and the theoretical carbon content and ratio of $Fe_5C_2$. The ratio (x) determined from X-ray diffraction strength is used for this purpose since this ratio approximately matches the ratio (z) by weight which is expressed by the equation $$z = \frac{(\text{weight of } Fe_5C_2) \times 100}{(\text{weight of } Fe_5C_2) + (\text{weight of } Fe_3O_4)}$$

FIG. 1 shows the relation between the ratio (x) of $Fe_5C_2$ and the coercive force (Oe) determined for a conventional product (within the area ABDE) and for acicular particles (A) of the invention (within the area CDFE); and FIG. 2 is a graph showing the relation between the Ni content and the coercive force as determined for particles incorporating Ni in the interior (Curve A) and for those covered with Ni over their surfaces (Curve B).

EXAMPLE 1

Five gram of acicular α-FeOOH particles were placed into a muffle furnace and heated at 800° C. for 1 hour to obtain acicular α-$Fe_2O_3$ particles which were 0.7 μm in average particle size (long axis) and 10 in average axial ratio. A 2 g quantity of the product was placed into a porcelain boat, then inserted into a tubular furnace, heated to 340° C. and contacted with CO which was fed at a rate of 200 ml/min for 3 hours. Table 1 shows the characteristics of the powder obtained.

EXAMPLES 2 and 3

Powders were prepared in the same manner as in Example 1 except the α-FeOOH heating temperature and α-$Fe_2O_3$—CO contact conditions listed in Table 1. Table 1 also shows the results.

REFERENCE EXAMPLES 1 to 3

Powders were prepared in the same manner as in Example 1 except the α-FeOOH heating temperature and α-$Fe_2O_3$—CO contact conditions listed in Table 1. The results are also given in Table 1.

EXAMPLE 4

A 0.5 liter quantity of 0.8 mole/liter solution of $FeCl_2$ containing 0.02 mol of $NiCl_2$ so that the Ni/Fe ratio was 5 atomic % was added to 1.5 liters of 2.67 moles/liter solution of NaOH. Air was passed through the mixture at a rate of 0.5 liter/min to obtain α-FeOOH particles containing Ni. The particles obtained were filtered off (with up to 1 ppm of Ni contained in the filtrate), washed with water, dried, pulverized, heated in air at 350° C. for 1 hour and subjected to reduction carburization at 340° C. for 2 hours while contacting the heat-treated product with CO which was fed at a rate of 200 ml/min. The powder obtained was 0.7 μm in average particle size (long, axis), 10 in average axial ratio, 695 Oe in coercive force and 79.7 emu/g in saturation magnanetization.

COMPARATIVE EXAMPLE 1

A powder was prepared in the same manner as in Example 4 with the exception of using no Ni. The powder was 930 Oe in coercive force and 88.1 emu/g in saturation magnetization.

EXAMPLE 5

$NiCl_2.6H_2O$ (6.16 g) was dissolved in 2 liters of water, and the solution was adjusted to a pH of 3 with HCl. Goethite (20 g) was admixed with the solution to obtain a uniform slurry having an Ni/Fe ratio of 10 atomic %. NaOH was added dropwise to the slurry with vigorous stirring to adjust the slurry to a pH of 10. Water glass No. 3 (0.35 g) was further added to the slurry to give an $SiO_2$/FeOOH ratio of 0.5 wt. %. The slurry was thereafter filtered, and the particles were washed with water, dried and pulverized. The Ni content of the filtrate was up to 1 ppm. The resulting powder was heated in air at 600° C. for 1 hour and subsequently treated at 310° C. for 6 hours in a CO stream which was fed at a rate of 200 ml/min. The powder obtained was 0.7 μm in average particle size (long axis), 10 in average axial ratio, 710 Oe in coercive force and 77.5 emu/g in saturation magnetization.

EXAMPLE 6

$NiSO_4.7H_2O$ (6.32 g) was dissolved in 2 liters of water, and the solution was adjusted to a pH of 3 with $H_2SO_4$. Lepidocrocite (20 g) was admixed with the solution to prepare a uniform slurry having an Ni/Fe ratio of 10 atomic %. $Na_2CO_3$ was added dropwise to the slurry with vigorous stirring to adjust the slurry to a pH of 9. The slurry was then filtered, and the particles were washed with water, dried and pulverized. The Ni content of the filtrate was up to 1 ppm. The resulting powder was heated in air at 350° C. for 1 hour and thereafter treated at 300° C. for 6 hours in a CO stream which was fed at a rate of 200 ml/min. The powder obtained was 0.7 μm in average particle size (long axis), 10 in average axial ratio, 643 Oe in coercive force and 72.9 emu/g in saturation magnetization.

TABLE 1

|  | heating temp (°C.) | contact temp (°C.) | contact time (hr) | $Fe_5C_2$ ratio (X) (%) | free carbon (%) | Hc (Oe) | *(a) | *(b) (emu/g) |
| --- | --- | --- | --- | --- | --- | --- | --- | --- |
| Ex. 1 | 800 | 340 | 3 | 93 | 8 | 740 | 1.4 | 89.1 |
| Ex. 2 | 900 | 340 | 4 | 92 | 9 | 710 | 1.4 | 89.3 |
| Ex. 3 | 1000 | 340 | 5 | 92 | 9 | 680 | 1.3 | 89.5 |
| Ref. Ex. 1 | 350 | 340 | 3 | 90 | 6 | 990 | 1.1 | 78.7 |
| Ref. Ex. 2 | 350 | 340 | 1 | 61 | 4 | 730 | 1.7 | 85.3 |
| Ref. Ex. 3 | 350 | 400 | 3 | 93 | 28 | 600 | 2.2 | 68.3 |

Note:
*(a) coercive force distribution
*(b) magnetization

EXAMPLE 7

Goethite prepared by the conventional method was heated at 350° C. for 1 hour for dehydration to obtain hematite. Ni(CH$_3$COO)$_2$·4H$_2$O (5.60 g) was dissolved in 2 liters of water, and the solution was adjusted to a pH of 4.7 with CH$_3$COOH. The hematite was admixed with the solution to obtain a uniform slurry having an Ni/Fe ratio of 10 atomic %. Concentrated aqueous solution of ammonia was added to the slurry with vigorous stirring to adjust the slurry to a pH of 10, and the slurry was filtered. The particles were washed with water, dried and pulverized. The powder obtained was treated at 300° C. for 6 hours in a CO stream which was fed at a rate of 200 ml/min. The powder thus prepared was 0.7 μm in average particle size (long axis), 10 in average axial ratio, 833 Oe in coercive force and 77.2 emu/g in saturation magnetization.

EXAMPLE 8

Concentrated aqueous solution of ammonia was added dropwise to 10 liters of aqueous solution of ferric chloride (0.2 mole/liter in concentration) with vigorous stirring until the solution was adjusted to a pH of 8. The resulting precipitate was filtered off and washed with water to obtain ferric hydroxide particles, which were then dispersed in water to prepare 2 liters of slurry. Sodium citrate (13 g) was added to the slurry, and sodium hydroxide was further added thereto until the slurry was adjusted to a pH of 12. The mixture thus obtained was stirred in a closed reactor at 150° C. for 3 hours. The resulting precipitate was filtered off, washed with water and dried, giving a reddish orange powder. The powder was found to be α-Fe$_2$O$_3$ by X-ray diffraction. Observation under an electron microscope revealed that the powder was 0.3 μm in average particle size (long axis) and 4 in average axial ratio.

The α-Fe$_2$O$_3$ powder (100 g) was dispersed in 2 liters of water. A silane coupling agent (6 g) was added to the dispersion for adsorption, the dispersion was thereafter filtered, and the particles were dried.

The powder obtained (2 g) was placed as contained in a porcelain boat into a tubular furnace and treated at 340° C. for 5 hours in a CO stream which was fed at a rate of 200 ml/min. The powder thus prepared was 725 Oe in coercive force and 92 emu/g in saturation magnetization.

COMPARATIVE EXAMPLE 2

Alpha-Fe$_2$O$_3$ obtained by heating α-iron oxyhydroxide powder for dehydration in the usual manner was brought into contact with CO in the same manner as in Example 8 to obtain a powder, which was 950 Oe in coercive force and 75 emu/g in saturation magnetization.

We claim:

1. Acicular particles having a coercive force of about 600 to about 700 O and a saturation magnetism of about 85 to about 95 emu/g, which particles contain iron carbide of the formula Fe$_5$C$_2$, which particles are obtained by heating an aqueous dispersion of ferric hydroxide under alkaline conditions with an effective amount of a water-soluble compound capable of coordinating to iron, which is necessary to control the direction and speed of growth of acicular particles of α-ferric oxide, to obtain an acicular α-ferric oxide product, said heating being to a temperature high enough so that substntailly no branched particles are obtained; and contacting said acicular α-ferric oxide product with a carbon-containing reducing-and-carburizing agent, or with a mixture of said carbon containing reducing and carburizing agent and a carbon-free reducing agent under conditions sufficient to convert α-ferric oxide product to iron carbide.

2. Acicular particles as defined in claim 1 which are at least 3 in average axial ratio.

3. Acicular particles as defined in claim 1 wherein said water-soluble compound capable of coordinating to iron is one having within its molecule at least one coordination group selected from the group consisting of —OH, —COOH, —O—, >C=O, —SO$_3$H, —PO$_3$H$_2$, —NH$_2$, =N—OH, →N, —SH, —S—, >C=S, —CS$_2$H, —COSH and —OCN.

4. Acicular particles as defined in claim 1 wherein the water-soluble compound is used in an amount of $1\times10^{-5}$ to 3 moles per gram atom of the iron of the ferric hydroxide.

5. Acicular particles as defined in claim 1 wherein the reducing-and-carburizing agent is CO, CH$_3$OH, HCOOCH$_3$ or a saturated or unsaturated aliphatic hydrocarbon having 1 to 5 carbon atoms.

* * * * *

UNITED STATES PATENT AND TRADEMARK OFFICE
CERTIFICATE OF CORRECTION

PATENT NO. : 5,437,805
DATED : August 1, 1995
INVENTOR(S) : Arase, et al

It is certified that error appears in the above-indentified patent and that said Letters Patent is hereby corrected as shown below:

On the title page: Item [75] line 2, delete "both of Osaki" insert therefor --both of Osaka --.

Signed and Sealed this

Twenty-ninth Day of April, 1997

Attest:

BRUCE LEHMAN

Attesting Officer        Commissioner of Patents and Trademarks